(12) United States Patent
Paquette

(10) Patent No.: US 7,817,166 B2
(45) Date of Patent: Oct. 19, 2010

(54) STEREO WINDOWING SYSTEM WITH TRANSLUCENT WINDOW SUPPORT

(75) Inventor: Michael J. Paquette, Benicia, CA (US)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 11/548,847

(22) Filed: Oct. 12, 2006

(65) Prior Publication Data

US 2008/0088644 A1 Apr. 17, 2008

(51) Int. Cl.
*G09G 5/00* (2006.01)
*H04N 13/00* (2006.01)
*H04N 13/04* (2006.01)
*G03B 35/00* (2006.01)
*G03B 21/00* (2006.01)
*G02B 27/22* (2006.01)
*G06K 9/00* (2006.01)

(52) U.S. Cl. ............... 345/629; 348/42; 348/51; 352/57; 353/7; 359/462; 382/154

(58) Field of Classification Search ............... 345/629; 348/42, 51; 352/57; 353/7; 359/462; 382/154
See application file for complete search history.

(56) References Cited

U.S. PATENT DOCUMENTS

| | | | | |
|---|---|---|---|---|
| 4,875,034 A | * | 10/1989 | Brokenshire | ............ 715/848 |
| 5,572,250 A | * | 11/1996 | Lipton et al. | ............ 348/43 |
| 5,651,107 A | * | 7/1997 | Frank et al. | ............ 715/768 |
| 5,801,705 A | * | 9/1998 | Kato et al. | ............ 345/419 |
| 5,898,433 A | * | 4/1999 | Hijikata | ............ 715/782 |
| 5,995,120 A | * | 11/1999 | Dye | ............ 345/543 |
| 6,122,000 A | * | 9/2000 | Yee et al. | ............ 348/51 |
| 6,157,351 A | * | 12/2000 | Olson | ............ 345/7 |
| 6,631,205 B1 | * | 10/2003 | Melen et al. | ............ 382/154 |
| 2003/0007070 A1 | * | 1/2003 | Lipton et al. | ............ 348/43 |
| 2003/0142138 A1 | * | 7/2003 | Brown et al. | ............ 345/797 |
| 2005/0285867 A1 | * | 12/2005 | Brunner et al. | ............ 345/537 |
| 2007/0085902 A1 | * | 4/2007 | Walker et al. | ............ 348/51 |

* cited by examiner

*Primary Examiner*—Xiao M Wu
*Assistant Examiner*—David T Welch
(74) *Attorney, Agent, or Firm*—Wong, Cabello, Lutsch, Rutherford & Brucculeri, L.L.P.

(57) ABSTRACT

An operating system level windowing system provides for the reliable display of multiple translucent windows. Incorporating stereo object processing within the windowing system itself (rather than at the application level), permits the windowing system to ensure that stereo content is reliably displayed (e.g., via use of blue-line technology) regardless of whether a window within which stereo content is displayed is occluded or overlapped by another window.

18 Claims, 9 Drawing Sheets

STEREO WINDOWING SYSTEM WITH TRANSLUCENT WINDOW SUPPORT

BACKGROUND

The invention relates generally to the presentation of stereo image information on a display for computer systems and, more particularly, to an operating system level windowing system having the capability to render stereo content.

There exist computer applications that present stereo content. These applications use one buffer to hold content intended for the left eye, another buffer to hold content intended for the right eye and a display system (memory and circuitry) to direct content to the appropriate eye from the appropriate buffer. Such applications may present stereo content using the entire display, or within the content area of a window.

Referring to FIG. 1, in one prior art stereo presentation methodology, full-screen stereo application 100 writes to frame buffer 105 and to frame buffer 110, each of which contains the content to be presented to one eye. A mechanism is used in conjunction with frame buffers 105, 110 and display 115 (e.g., stereo shutter glasses or polarization filters) to direct the content from the appropriate buffer to the left or right eye of user 120. One such mechanism uses blue-line technology in which the last scan-line of each frame buffer contains a blue line on black (e.g., 125, 130 and 135). If the first ¼ of the line is blue, the content is intended for the left eye (i.e., from frame buffer 105). If the first ¾ of the line is blue, the content is intended for the right eye (i.e., from frame buffer 110). In practice, the application responsible for generating the stereo display generates a small window (separate from the window used to present stereo content) that it places at the bottom of the display screen with the blue-line in it—e.g., 125 and 130. As such, the computer system's video system generates a video signal with the blue-line information in it. The video signal, in turn, is output to the viewing device (e.g., stereo shutter glasses) which detects this signal and, based on its value, causes the appropriate eye to receive the displayed information. Alternatively, an external hardware device may be used to directly control operation of the viewing device. In this latter embodiment, no blue-line window need be generated by the presenting application.

In prior art embodiments such as shown in FIG. 1, presenting application 100 is required to draw all of the content for both the left and right eye (stereo elements and non-stereo elements) into frame buffers 105 and 110. In addition, because the entire display is used, no other application may display information.

Referring to FIG. 2, in another prior art stereo presentation methodology, applications 200, 205 and 210 write into their respective backing store memories. Non-stereo applications 200 and 205 each write into a single backing store (i.e., 215 and 220), while stereo application 210 writes into two backing stores—one having content intended for the left eye (i.e., 225) and one having content intended for the right eye (i.e., 230). In a system in accordance with FIG. 2, a pair of frame buffers 235 and 240 is used to present stereo content to user 245 via display 250. As shown, non-stereo applications 200 and 205 provide information for the display of non-stereo windows 255 and 260 to each of frame buffers 235 and 240. Stereo application 210, however, provides left-eye content 265 and left-eye blue-line window 270 (via left backing store 225) to left frame buffer 235 and right-eye content 275 and right-eye blue-line window 280 (via backing store 230) to right frame buffer 240. In prior art embodiments such as shown in FIG. 2, the operating system window's system (or server) copies the contents of the various backing stores (e.g., 215-230) to the frame buffers (e.g., 235 and 240) and, as a result, stereo application 210 cannot reliably produce stereo output using blue-line technology because it cannot guarantee that its blue line windows (e.g., 270 and 280) will remain "on top" in display 250 and, therefore, not occluded by another window. (The X11 operating environment is one example of this approach.) If either of non-stereo applications 200 or 205 windows 255 or 260 occlude any part of stereo application 210's blue-line windows 270 and 280, stereo production is lost to user 245.

Thus, it would be beneficial to provide methods and devices that reliably display stereo content information in a windowing environment that also provides for, and accommodates, translucency between all displayed windows (stereo and non-stereo).

SUMMARY

In one embodiment the invention provides a method to display stereo content in a windowing environment. The method includes: obtaining content for a first display window, wherein the content includes stereo and non-stereo portions, both of which have associated transparency information; obtaining content for a second display window which also has associated transparency information; and generating composited image by blending the contents for the first and second display windows so as to maintain stereo presentation of the first display window regardless of any overlap between the first and second display windows. Methods in accordance with the invention may be stored in any media that is readable and executable by a computer system.

In another embodiment, the invention provides a stereo windowing system that includes: a first display memory having content for the non-stereo presentation of content (incorporating transparency information) for a first display window; a second display memory (incorporating transparency information) for the stereo presentation of content for the first display window; a third display memory (incorporating transparency information) having content for the display of a second display window; a display; first and second frame buffer memories; and a compositing engine that includes—a monocular processing component for alpha-blending content from the first and third display memories into one or more of the frame buffer memories, a stereo processing component for alpha-blending content from the second display memory to both the first and second frame buffers, and a display component for transferring alpha-blended content of the frame buffers to the display.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

More specifically, an illustrative stereo display system as described herein is embodied within the Quartz® compositor of Apple Computer's Mac OS® X operating system. (QUARTZ and MAC OS are registered trademarks of Apple Computer, Inc.) The Quartz compositor provides windowing system services that applications use to generate windowed displays. As used herein, a compositor is a window system component that blends (also referred to as alpha-blends) the contents of various application backing stores to the display, mixing the contents of each window depending upon its opacity. In general, a compositor may be implemented entirely in software or it may be implemented as a combination of software and hardware.

Figure 1:
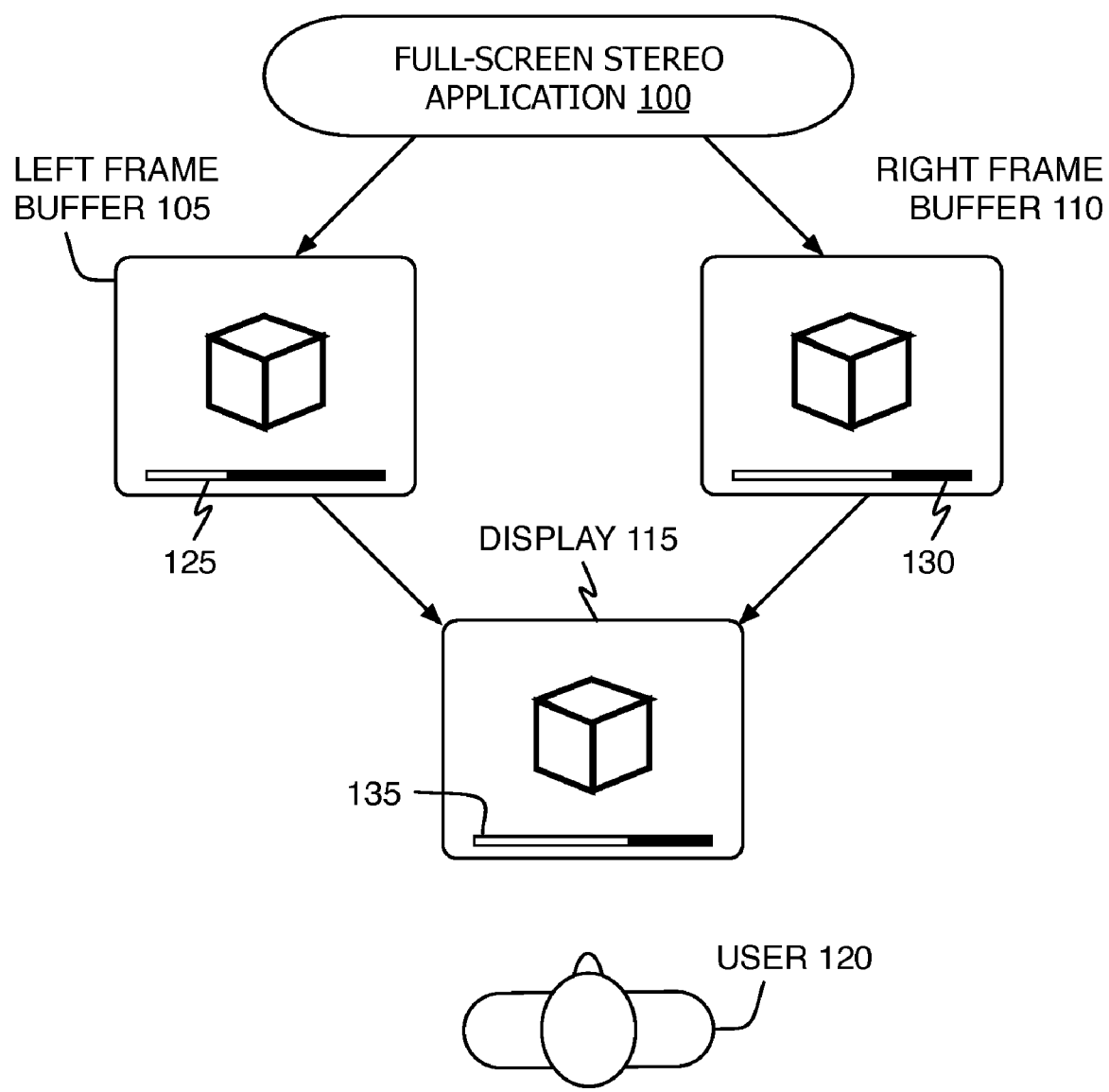
FIG. 1 illustrates a full-screen technique to display stereo content in accordance with the prior art.
Figure 2:
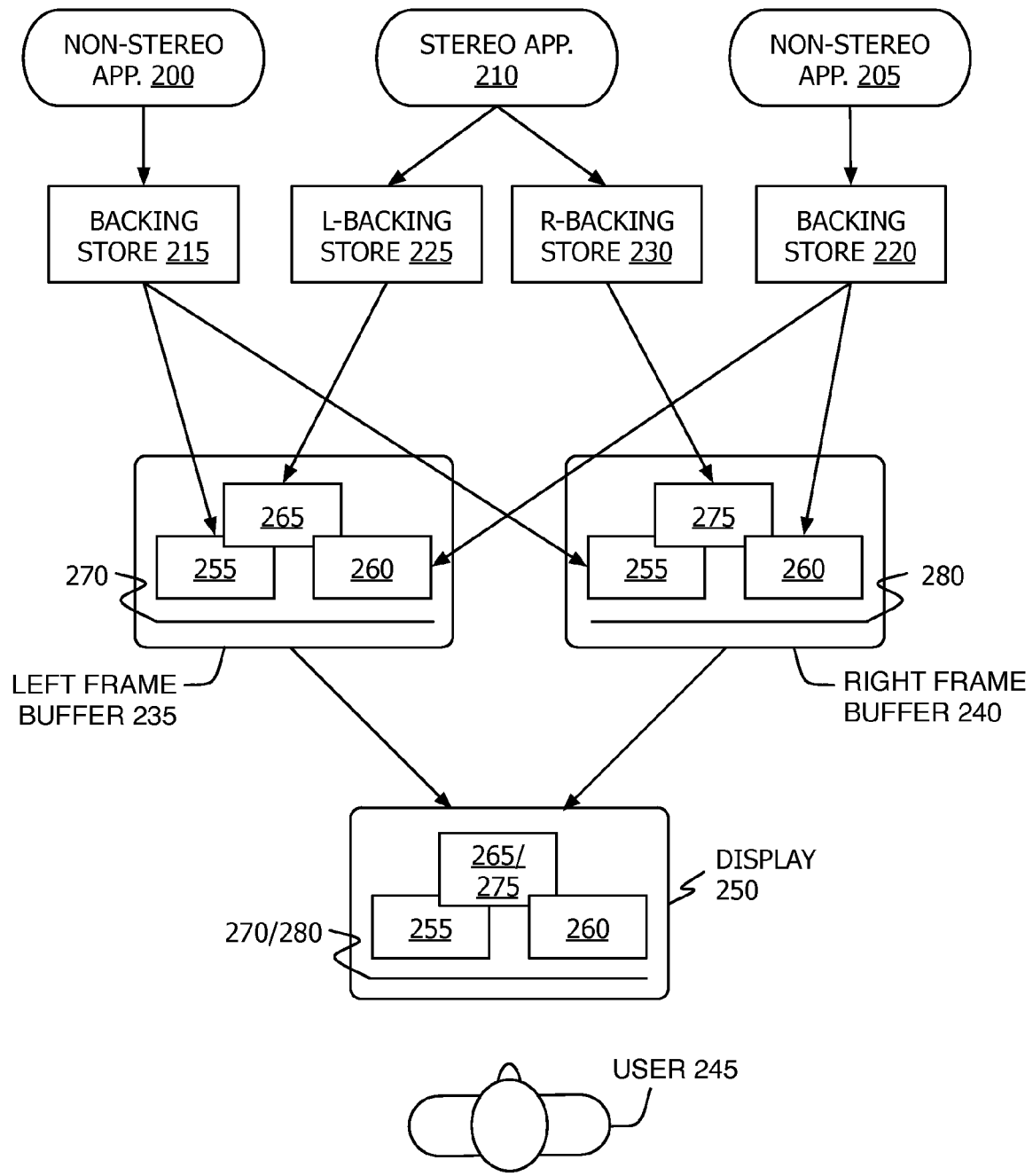
FIG. 2 illustrates a window-based technique to display stereo content in accordance with the prior art.
Figure 3:
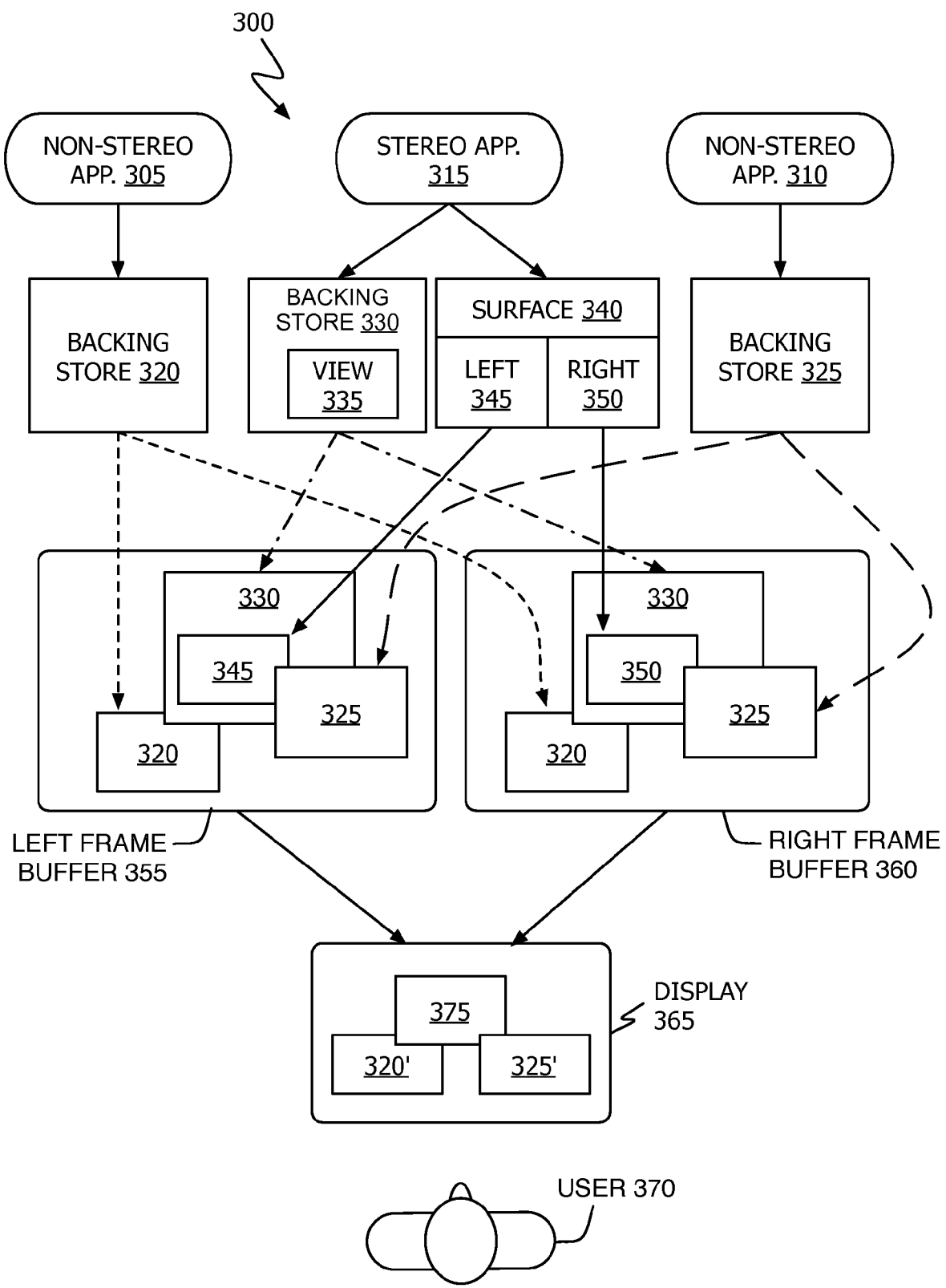
FIG. 3 shows a windows-based technique to display stereo content in accordance with one embodiment of the invention.

Referring to FIG. 3, stereo display system 300 in accordance with one embodiment of the invention includes executing applications 305, 310 and 315. Applications 305 and 310 are non-stereo applications that use a single backing store each (i.e., 320 and 325). Stereo application 315, uses backing store 330 (including view 335) and surface 340. A view is a region of interest within a backing store/window and may contain text, controls, images, video or other window content. A surface is associated with a view, but occupies logically separate storage from that of the view. For example, surface 340 could be implemented as a buffer in main memory or in memory associated with a hardware graphics card or other device. In accordance with the invention, the contents of backing store 330 and associated view 335 represent non-stereo elements of a window while the contents of surface 335 represents stereo elements of the window. In one embodiment, for example, surface 340 comprises left portion 345 and right portion 350—each retaining information related to its "eye" view (i.e., right or left). In the illustrated embodiment, surface 340 is represented as a stereo surface structure in accordance with the OpenGL 2.0 standard (see http://www.open gl.org). (OPENGL is a registered trademark of Silicon Graphics, Inc.)

After individual applications 305, 310 and 315 draw to their respective backing stores and/or surfaces, the operating system's windowing system or compositing component (e.g., the Quartz compositor) flushes these locations to left and right frame buffers 355 and 360. More specifically, the compositor copies non-stereo data and associated transparency or alpha value data in backing stores 320, 325 and 330 (including view 335) to both left and right frame buffers 355 and 360. The compositor also copies that portion of surface 340's content (also including transparency or alpha value data) that is intended for the left eye (345) to left frame buffer 355 and that portion of surface 340's content intended for the right eye (350) to right frame buffer 360. Left and right frame buffers 355 and 360 are then flushed in a synchronous manner to display 365 where user 370 views a stereo representation of all visible windows 320' (representing the viewable aspects of non-stereo content 320), 325' (representing the viewable aspects of non-stereo content 325) and 370 (representing the visible aspects of stereo content 345 and 350).

One benefit of incorporating stereo graphics capability within an operating system's windowing system in accordance with the invention is that stereo applications no longer have to use two backing stores. Each application needs only a single backing store and, while non-stereo applications may use any number of views, only stereo applications presenting stereo content need use a surface construct (often times hardware supported). Another benefit in accordance with the invention is that applications do not have to write non-stereo elements into two frame buffers (the window manager element of the operating system does this in accordance with the invention).

Other benefits in accordance with the invention include the ability to support transparency among, and between, all windows (stereo and non-stereo) and the ability to reliably support blue-line technology in a windowed environment. These latter benefits are a non-obvious consequence of placing the locus of stereo content processing within the operating system's windowing system. Because it is the windowing system (i.e., compositor) that manipulates stereo content in accordance with the invention rather than individual applications, it does not matter if the visible aspects of a first window (opaque or translucent) overlaps the visible aspects of a stereo window—the compositor can ensure that (1) transparency is treated on a pixel-by-pixel basis and (2) the required blue-line is established as the top-most element of the display. Accordingly, a windowing engine in accordance with the invention supports full transparency and blue-line technology in a windowed environment.

Figure 4A:
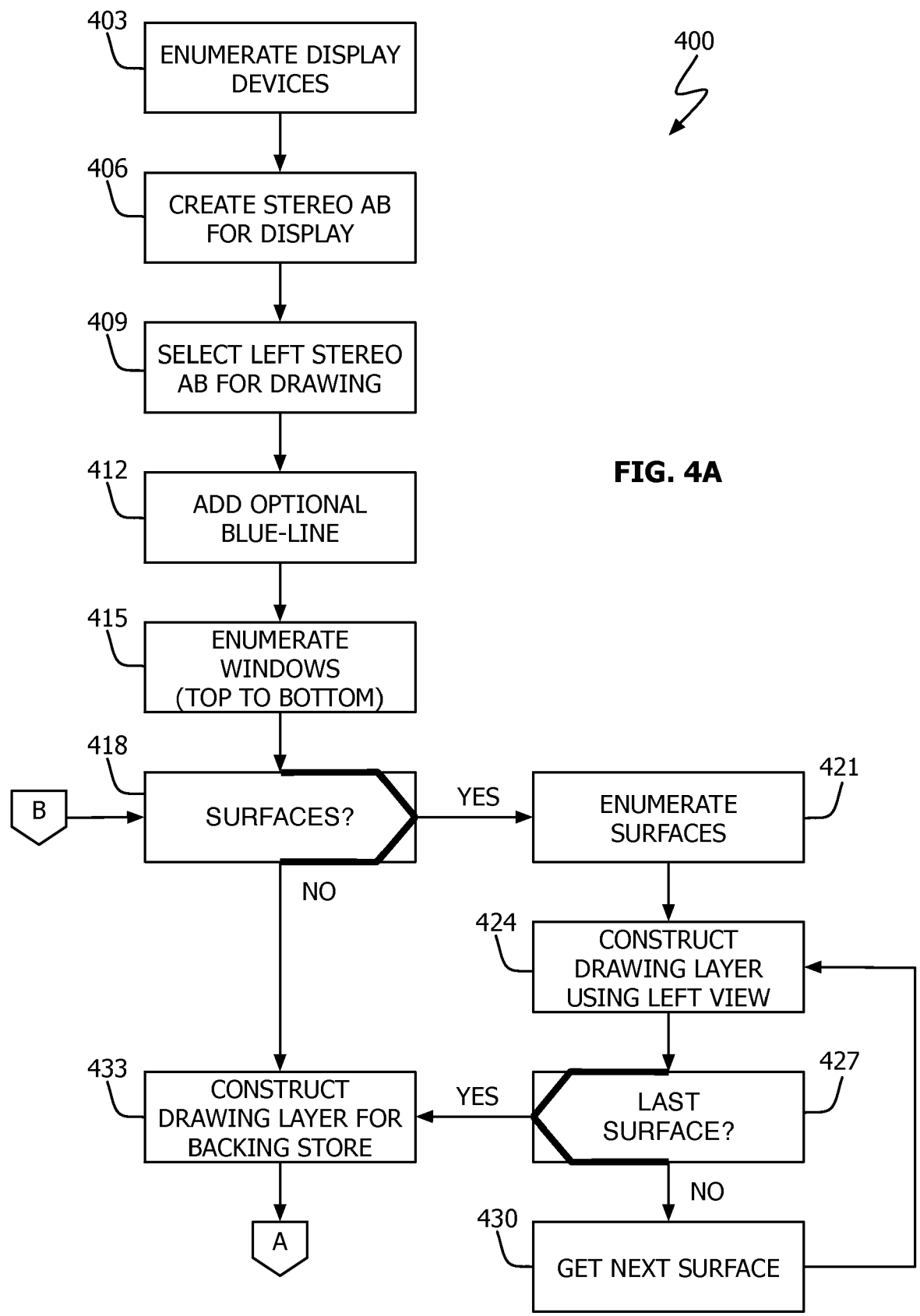
FIGS. 4A-4C show, in flowchart form, the operation of a window server or system in accordance with one embodiment of the invention.
Figure 4B:
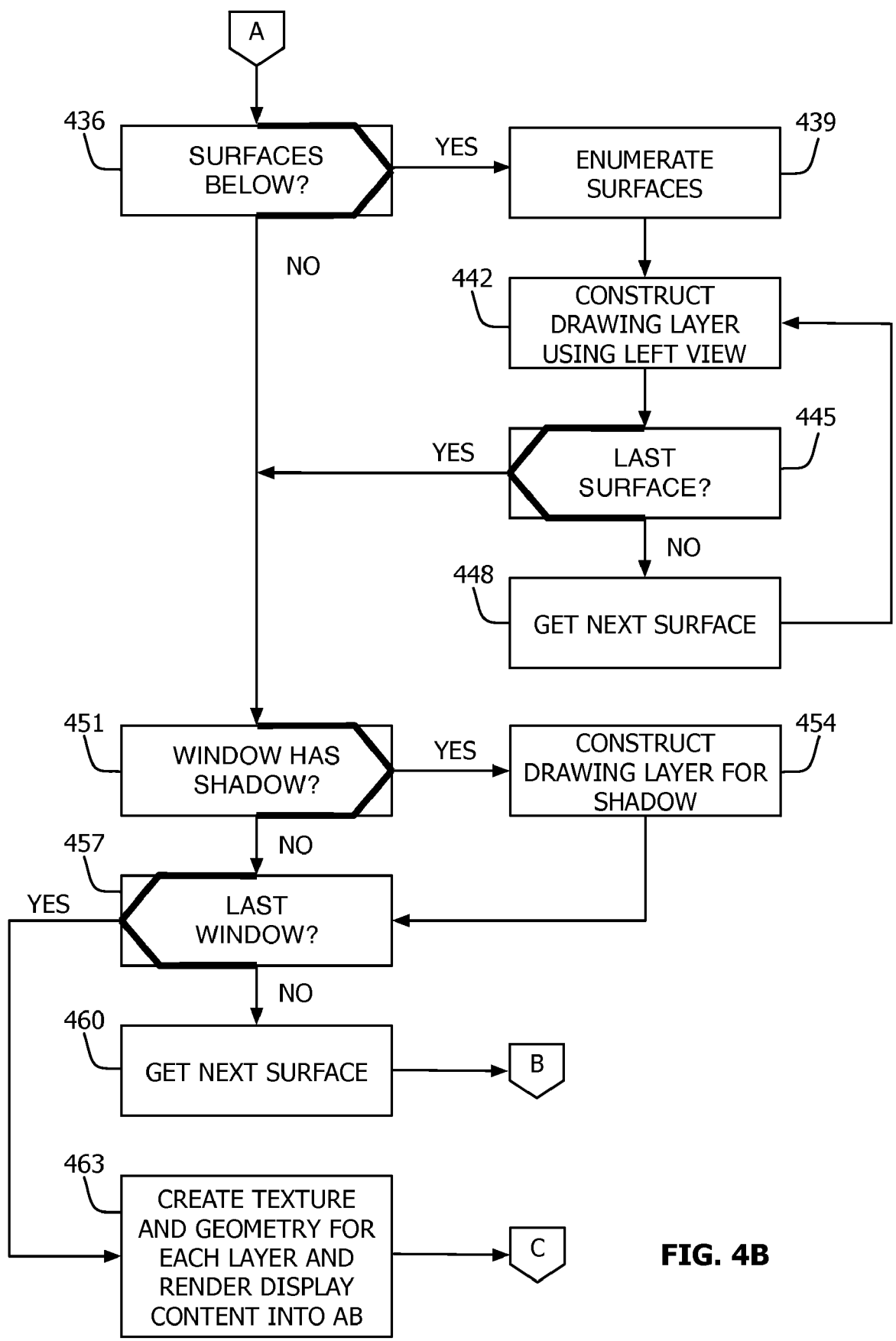
Figure 4C:
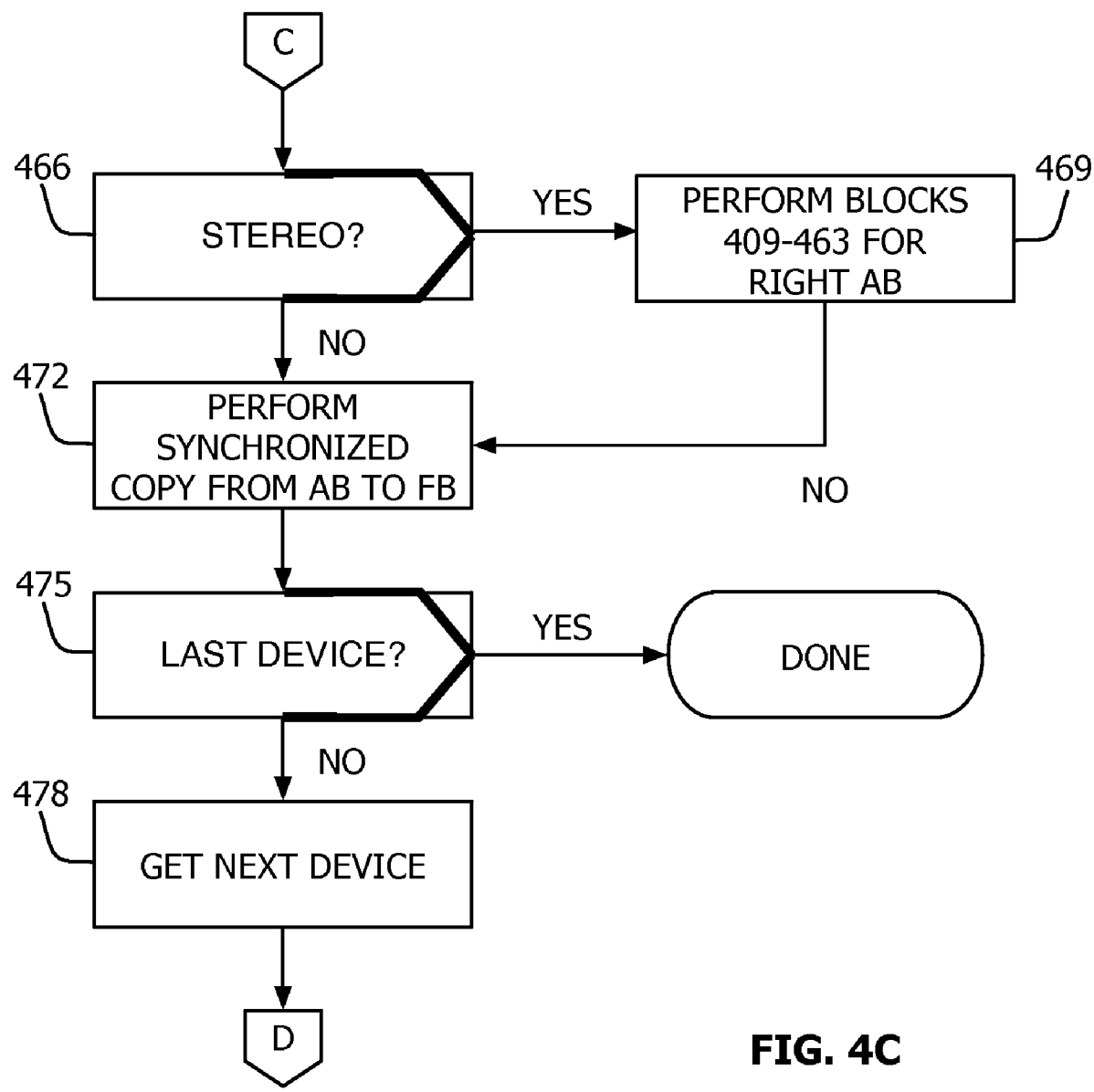

Referring to FIGS. 4A-4C, operation of a stereo compositor in accordance with one embodiment of the invention (process 400) begins with the creation of a stereo assembly buffer for each display device present in the system (blocks 403-406 and 475-478). First for the left eye (blocks 409-466), and then for the right (block 469), an optional blue-line is added (block 412), all windows are enumerated from front to back (block 415) and the content of all windows and attached surfaces is mapped to drawing layers (blocks 418-463). For stereo surfaces, left eye content is mapped to drawing layers for the left eye, and right eye content is mapped to layers for the right eye. For stereo depth cues based on window position, an optional transformation may be applied to windows and attached surfaces for the right eye based on the window ordering from front to back (i.e., "Z order"). By way of example, these optional transformations may be performed between acts in accordance with blocks 415 and 418 (for either or both the left eye content or right eye content). For example, affine transformations may be applied to window content that is supposed to be on top and, in the right-eye view, moved slightly to the left so that it appears in front. Once all windows and attached surfaces have been enumerated, the drawing layers are used to construct or update OpenGL geometry and texture data (e.g., OpenGL stereo surface structures), which is then rendered to the stereo assembly buffer (block 463). The contents of the stereo assembly buffer are then copied to the display frame buffers during the next display refresh cycle—a "synchronized copy" operation (block 472). In accordance with block 466, if stereo processing is not needed, the acts of block 469 are not performed so that only a monocular display is generated.

Figure 5:
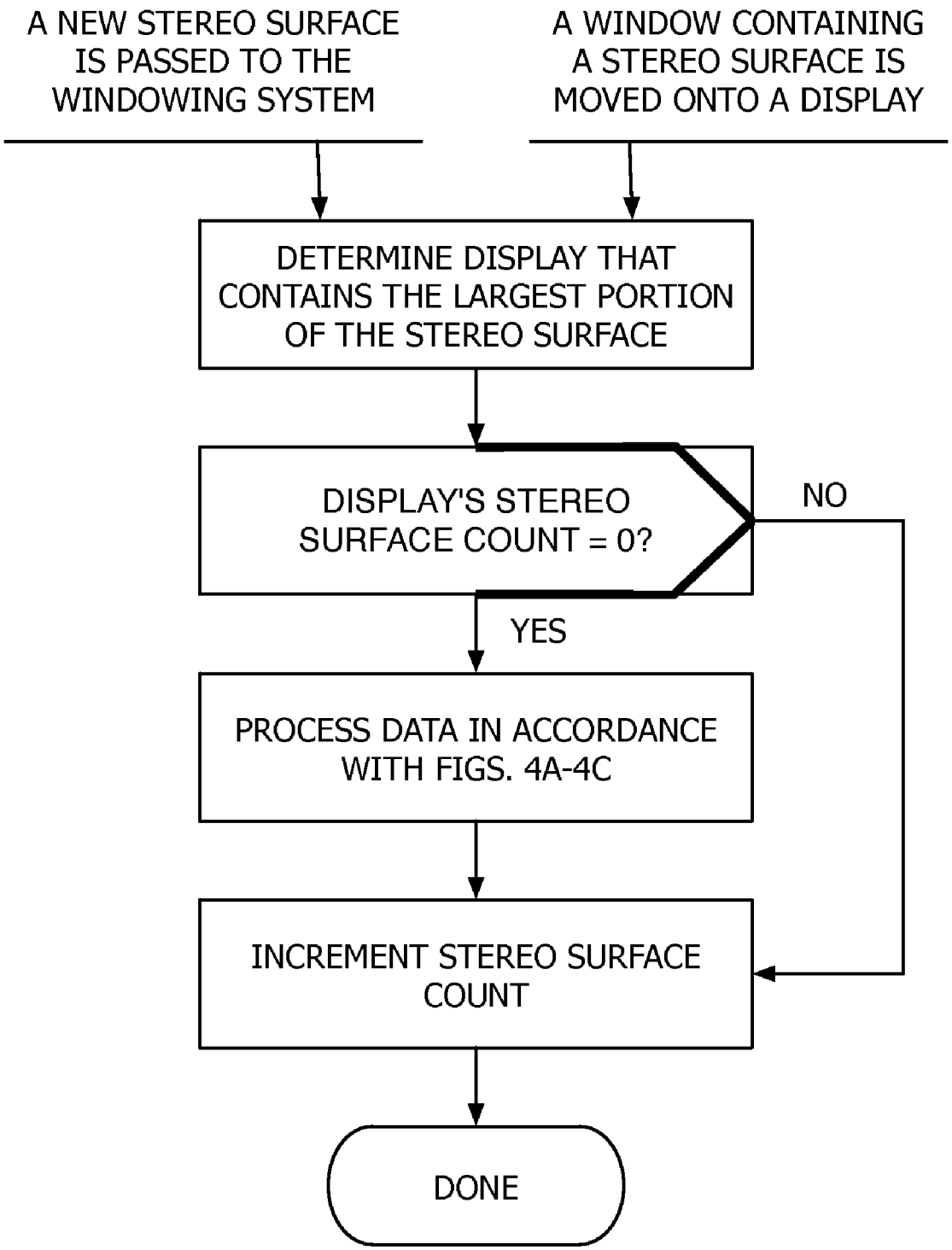
FIG. 5 shows, in flowchart form, an auto-enable operation in accordance with one embodiment of the invention.
Figure 6:
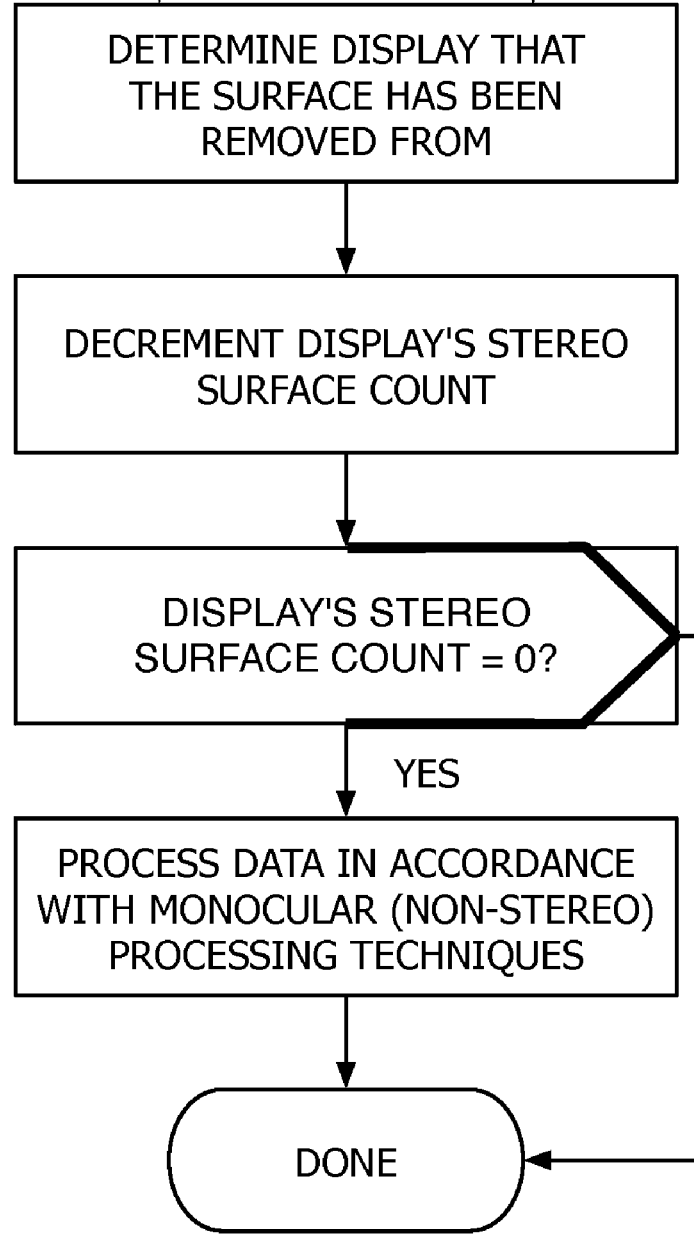
FIG. 6 shows, in flowchart form, an auto-disable operation in accordance with one embodiment of the invention.

Referring to FIG. 5, in one embodiment of the invention the windowing system automatically determines when stereo processing is required. In this manner, monocular processing (blocks 403-463 and 472-478 in FIGS. 4A-4C) is performed when no stereo content is being displayed while stereo processing (FIGS. 4A-4C in toto ) is performed when one or more stereo surfaces are to be displayed. Similarly, as shown in FIG. 6, when the windowing system determines that there is no stereo data to display, it automatically disables stereo processing—returning to conventional monocular display processing.

Figure 7:
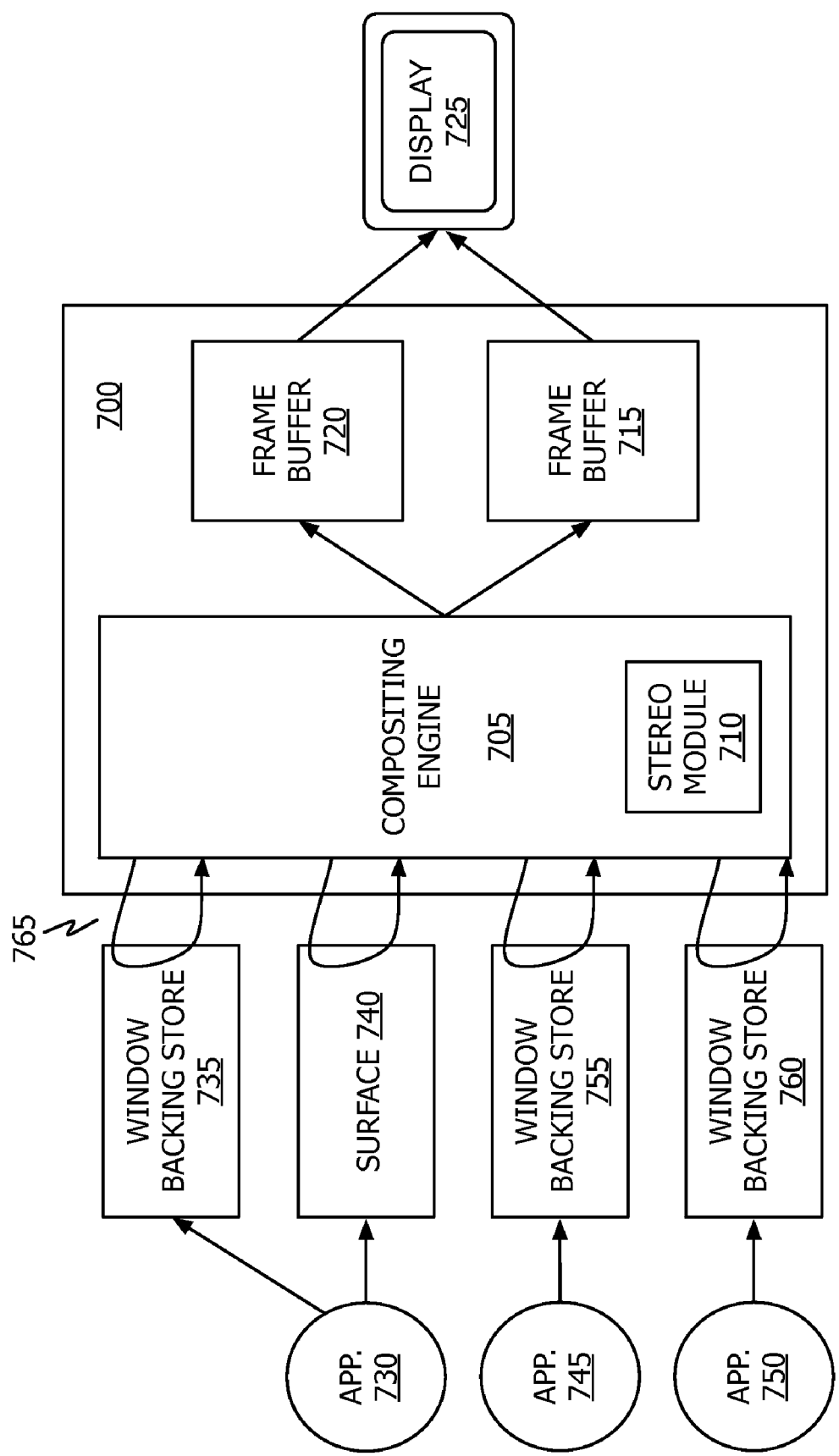
FIG. 7 shows, in block diagram form, a stereo windowing system in accordance with one embodiment of the invention.

Referring to FIG. 7, in accordance with another embodiment of the invention windowing system 700 includes compositing engine 705, stereo module 710 and frame buffers 715 and 720. The function of compositing engine 705 is to perform monocular display processing as well as to automatically transition between monocular and stereo processing in accordance with FIGS. 5 and 6. The function of stereo module 710 is to perform acts functionally equivalent to those described above for FIGS. 4A-4C. Frame buffers 715 and 720 are used to synchronously update display 725.

As shown, stereo application 730 uses window backing store 735 and surface 740 to represent stereo content that it (application 730) wishes to present via display 725. Non-stereo applications 745 and 750 use backing stores 755 and 760 to retain non-stereo content for display. As indicated by elements 765, compositing engine 705 periodically retrieves (or "flushes") data from application backing stores 735, 755, 760 and stereo surface 740 to process in accordance with FIGS. 4A-4C. It will be recognized that each of applications 730, 745 and 750 are responsible for updating the contents of their respective backing store (and surface for stereo application 730).

When a region of display 725 requires updating, as by window movement, geometry changes or content changes, compositing engine 700 assembles new content for the affected display region by combining content from all windows (backing stores 735, 755, 760 and surface 740) contributing content to the affected region in accordance with their associated transparency or alpha data. This mechanism allows the displayed content at any given point on display 725 to be a composite of all buffers logically beneath that point, with the content of the buffers being blended together under control of transparency information associated with each point within each buffer/backing store and surface. Accordingly, in accordance with the invention compositing engine 700 permits translucent content of one or more windows associated with non-stereo applications to overlap stereo window content associated with a stereo application while reliably supporting the use of blue-line technology.

Various changes in the components and circuit elements, as well as in the details of the illustrated operational methods are possible without departing from the scope of the following claims. For example, non-stereo applications may also employ or use views. That is, views are not restricted to stereo applications as described herein. In addition, acts in accordance with FIGS. 4A-4C, 5 and 6 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A general purpose computer comprising one or more programmable control devices programmed to perform a windowing system method for displaying stereo content, the method comprising:
    obtaining first content for a first display window by one of the one or more programmable control devices, the first content having a stereo portion, blue-line information corresponding to the stereo portion, and a non-stereo portion, each of the stereo and non-stereo portions having associated transparency information;
    obtaining second content for a second display window by one of the one or more programmable control devices, the second content associated with transparency information; and generating a composited image by
        generating a blue-line for the content of the first display window;
        placing the blue-line in a front-most layer of the composited image; and
        blending the first content and the second content in accordance with their associated transparency information so as to maintain stereo presentation of the first content in the first display window utilizing the blue-line information even in the event that the first display window is at least partially occluded by the second display window.

2. The general purpose computer of claim 1, wherein the programmable control device is further programmed to display the composited image.

3. The general purpose computer of claim 1, wherein said generating a composited image further comprises displaying the composited image including the blue-line.

4. The general purpose computer of claim 1, wherein said obtaining first content comprises obtaining content from a first application and said obtaining second content comprises obtaining content from a second application.

5. The general purpose computer of claim 1, wherein obtaining the stereo portion comprises obtaining content from a surface object.

6. The general purpose computer of claim 5, wherein said obtaining content from a surface object comprises obtaining left-eye content and right-eye content from the surface object.

7. The general purpose computer of claim 5, wherein the surface object is retained in a memory associated with a hardware graphics device.

8. The general purpose computer of claim 1, wherein said obtaining first content, said obtaining second content, and said generating a composited image are performed by an operating system level module.

9. The general purpose computer of claim 1, wherein said obtaining second content comprises obtaining a stereo portion and a non-stereo portion, each of which has associated transparency information.

10. A program storage device, readable by a programmable control device, comprising instructions stored on the program storage device for causing the programmable control device to perform the method of claim 1.

11. The program storage device of claim 10, wherein the instructions to obtain the stereo portion comprise instructions to obtain content from a surface object.

12. The program storage device of claim 11, wherein the instructions to obtain content from a surface object comprise instructions to obtain the stereo portion from memory associated with a hardware graphics device.

13. The program storage device of claim 10, wherein the instructions to obtain first content, the instructions to obtain second content, and the instructions to generate a composited image are executed by an operating system level window component.

14. The method of claim 10, wherein the instructions to obtain second content comprise instructions to obtain a stereo portion and a non-stereo portion, each of which has associated transparency information.

15. A stereo window system, comprising:
- a first display memory for a first display window, the first display memory for storing non-stereo content having transparency information;
- a second display memory for the first display window, the second display memory for storing stereo content having transparency information;
- a third display memory for storing blue-line information associated with the stereo content;
- a fourth display memory for a second display window, the fourth display memory for storing non-stereo content having transparency information;
- a display;
- first and second frame buffer memories operatively coupled to the display; and
- a compositing engine operatively coupled to the first, second, third and fourth display memories and the first and second frame buffer memories, the compositing engine including
  - a monocular processing component for alpha-blending content from the first and fourth display memories into one or more of the frame buffer memories,
  - a stereo processing component for:
    - alpha-blending content from the second display memory to both the first and second frame buffers; and
    - generating a blue-line for the content of the second display memory so as to maintain blue-line information for the stereo content after alpha-blending; and
  - a display component for transferring alpha-blended content of the frame buffers to the display wherein the blue-line information is available in a front-most layer of a composited image.

16. The stereo window system of claim 15, wherein the compositing engine comprises one or more operating system level software modules.

17. The stereo window system of claim 15, wherein the first and second display memories comprise operating system main memory.

18. The stereo window system of claim 15, wherein the second display memory comprises memory associated with a graphics processing card operatively coupled to the stereo window system.

* * * * *

UNITED STATES PATENT AND TRADEMARK OFFICE
CERTIFICATE OF CORRECTION

PATENT NO. : 7,817,166 B2  Page 1 of 2
APPLICATION NO. : 11/548847
DATED : October 19, 2010
INVENTOR(S) : Michael J. Paquette It is certified that error appears in the above-identified patent and that said Letters Patent is hereby corrected as shown below:

In column 4, line 1, delete "370" and insert -- 375 --, therefor.

In column 6, line 4-29, in claim 1, delete
"A general purpose computer comprising one or more programmable control devices programmed to perform a windowing system method for displaying stereo content, the method comprising: obtaining first content for a first display window by one of the one or more programmable control devices, the first content having a stereo portion, blue-line information corresponding to the stereo portion, and a non-stereo portion, each of the stereo and non-stereo portions having associated transparency information;
obtaining second content for a second display window by one of the one or more programmable control devices, the second content associated with transparency information; and generating a composited image by
generating a blue-line for the content of the first display window;
placing the blue-line in a front-most layer of the composited image; and
blending the first content and the second content in accordance with their associated transparency information so as to maintain stereo presentation of the first content in the first display window utilizing the blue-line information even in the event that the first display window is at least partially occluded by the second display window." and insert -- A general purpose computer comprising one or more programmable control devices programmed to perform a windowing system method for displaying stereo content, the method comprising:

obtaining first content for a first display window by one of the one or more programmable control devices, the first content having a stereo portion, blue-line information corresponding to the stereo portion, and a non-stereo portion, each of the stereo and non-stereo portions having associated transparency information;

Signed and Sealed this
Twenty-second Day of November, 2011

David J. Kappos
*Director of the United States Patent and Trademark Office*

CERTIFICATE OF CORRECTION (continued)
U.S. Pat. No. 7,817,166 B2 obtaining second content for a second display window by one of the one or more programmable control devices, the second content associated with transparency information; and generating a composited image by generating a blue-line for the content of the first display window;

placing the blue-line in a front-most layer of the composited image; and blending the first content and the second content in accordance with their associated transparency information so as to maintain stereo presentation of the first content in the first display window utilizing the blue-line information even in the event that the first display window is at least partially occluded by the second display window. --, therefor.